(12) United States Patent
Zickgraf et al.

(10) Patent No.: US 12,424,650 B2
(45) Date of Patent: Sep. 23, 2025

(54) FUEL CELL SYSTEM ASSEMBLY

(71) Applicant: Robert Bosch GmbH, Stuttgart (DE)

(72) Inventors: Bernhard Zickgraf, Neckarsulm (DE); Sebastian Nuber, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 553 days.

(21) Appl. No.: 17/794,247

(22) PCT Filed: Dec. 28, 2020

(86) PCT No.: PCT/EP2020/087906
§ 371 (c)(1),
(2) Date: Jul. 20, 2022

(87) PCT Pub. No.: WO2021/148226
PCT Pub. Date: Jul. 29, 2021

(65) Prior Publication Data
US 2023/0073323 A1    Mar. 9, 2023

(30) Foreign Application Priority Data

Jan. 22, 2020  (DE) ............... 10 2020 200 709.8

(51) Int. Cl.
*H01M 8/249* (2016.01)
*H01M 8/0265* (2016.01)
(Continued)

(52) U.S. Cl.
CPC ......... *H01M 8/249* (2013.01); *H01M 8/0265* (2013.01); *H01M 8/04029* (2013.01); *H01M 8/04074* (2013.01)

(58) Field of Classification Search
CPC ............... H01M 8/249; H01M 8/0265; H01M 8/04027; H01M 8/04074
(Continued)

(56) References Cited

U.S. PATENT DOCUMENTS

| 2004/0224201 A1 | 11/2004 | St-Pierre et al. |
| 2013/0171536 A1 | 7/2013 | Cerceau et al. |
| 2017/0229721 A1* | 8/2017 | Baika ................ H01M 8/04225 |

FOREIGN PATENT DOCUMENTS

| CN | 1893158 A | 1/2007 |
| DE | 102015015635 A1 | 6/2017 |

(Continued)

OTHER PUBLICATIONS

Translation of International Search Report for Application No. PCT/EP2020/087906 dated Apr. 21, 2021 (2 pages).

*Primary Examiner* — James M Erwin
(74) *Attorney, Agent, or Firm* — Michael Best & Friedrich LLP

(57) ABSTRACT

The invention relates to a fuel cell system assembly comprising at least two coupled fuel cell systems (A, B) that can be operated at different load points, each fuel cell system (A, B) being connected to a respective cooling circuit (3A, 3B) comprising a circulating coolant, via a coolant supply line (1A, 1B) and a coolant drain line (2A, 2B). According to the invention, the cooling circuits (3A, 3B) are coupled via a common return line (4), via which the coolant supply lines (1A, 1B) can be supplied with coolant, and a return conduit of at least one ancillary unit (5, 6), for example an electric heating device (5) and/or a heater core (6), is connected to the common return line (4).

10 Claims, 2 Drawing Sheets

(51) Int. Cl.
*H01M 8/04007* (2016.01)
*H01M 8/04029* (2016.01)

(58) Field of Classification Search
USPC .......................................................... 429/434
See application file for complete search history.

(56) References Cited

FOREIGN PATENT DOCUMENTS

| DE | 102016200612 A1 | 7/2017 |
|---|---|---|
| JP | 2005005087 A | 1/2005 |
| WO | 2020044259 A1 | 3/2020 |
| WO | 2020044260 A1 | 3/2020 |

\* cited by examiner

FUEL CELL SYSTEM ASSEMBLY

BACKGROUND OF THE INVENTION

The invention relates to a fuel-cell-system combination. Such a fuel-cell-system combination comprises multiple coupled fuel-cell systems which can be operated at different load points.

A fuel-cell system oxidizes a fuel, for example hydrogen, through combination with oxygen. In this process, electrons are freed and there is a build-up of an electrical voltage which, by being applied to a suitable resistor, can be used for performance of electrical work. With continuous feeding of fuel and oxygen, this process can take place virtually for as long as desired.

The electrochemical process which takes place in a fuel-cell system is affected by loss since a portion of the energy contained in the fuel is converted into heat. This needs to be removed, with the aid of a suitable cooling device, in order to maintain the efficiency and the service life of the system. The quantity of heat to be removed depends inter alia on the operating parameters on the system.

A commonly used cooling method is the connection of the fuel-cell system to a cooling circuit. The coolant of the cooling circuit is pumped through suitable channels of the fuel-cell system, such that it absorbs and carries away heat as it passes through the system. The absorbed heat is subsequently extracted from the coolant again by means of a suitable cooling device, for example a heat exchanger, so that said coolant can once again be used for cooling the fuel-cell system. Auxiliary units are in this case generally incorporated into the cooling circuit and use the waste heat of the fuel-cell system, for example for heating a passenger compartment, and/or heat the fuel-cell system in a start-up situation in the case of low outside temperatures.

If, for the purpose of covering an increased power requirement, multiple fuel-cell systems are coupled to form a combination, the requisite cooling of the systems often turns out to be difficult on account of installation space restrictions. If, moreover, at least one auxiliary unit is to be incorporated into the cooling system, the complexity increases further.

SUMMARY OF THE INVENTION

The present invention is therefore based on the object of facilitating the incorporation of at least one auxiliary unit into a combination comprising multiple fuel-cell systems. Furthermore, the intention is for the efficiency of the auxiliary unit to be increased.

What is proposed is a fuel-cell-system combination comprising at least two coupled fuel-cell systems which can be operated at different load points. Each fuel-cell system is connected to in each case one cooling circuit, with a circulating coolant, via a coolant feed line and a coolant discharge line. According to the invention, the cooling circuits are likewise coupled, specifically via a common recirculation line, via which the coolant feed lines can be supplied with coolant. Moreover, a return with at least one auxiliary unit is connected to the common return line. The auxiliary unit may for example be an electrical heating device and/or a heating heat exchanger.

Coupling of the cooling circuits result in savings in terms of line lengths, so that the installation space requirement and the costs are reduced. At the same time, the quantity of coolant can be reduced. If the auxiliary unit is an electrical heating device, this may be used during a cold start for heating all the coupled fuel-cell systems. This is because coolant heated via the electrical heating device passes via the return into the common recirculation line and, from here, is distributed among the coolant feed lines of the individual fuel-cell systems. One electrical heating device can consequently be used as an independent heater for all the fuel-cell systems. As a result, the efficiency of the electrical heating device can thereby be increased.

Preferably, at least two auxiliary units are connected to the common recirculation line via the return. Said auxiliary units may be connected in parallel or in series. Preferably, provision is made of an electrical heating device as first auxiliary unit and of a heating heat exchanger as second auxiliary unit. With the aid of the heating heat exchanger, it is possible for example for cabin heating to be realized. The heating heat exchanger may for this purpose use the waste heat of the fuel-cell systems. The heating heat exchanger is therefore preferably connected at the inlet side—at least indirectly—to at least one coolant discharge line of a fuel-cell system.

In one refinement of the invention, it is proposed that the coolant discharge lines of the fuel-cell systems can each be connected to the corresponding coolant feed line of the respective fuel-cell system via a branch valve and a branch line. Consequently, coolant removed from the fuel-cell systems or heated coolant can be introduced into the coolant feed lines in order for its temperature to be controlled. Since each fuel-cell system is equipped with its own branch valve and its own branch line, the temperature control may be performed individually, specifically preferably in a load-dependent manner, for each system. For this purpose, the branch valves are preferably designed as 3/2-way valves and/or can be adjusted in a continuously variable manner.

Since the branch lines conduct heated coolant, it is furthermore proposed, as a refining measure, that an inlet of the at least one auxiliary unit is connected to at least one branch line. In this way, the waste heat of the fuel-cell system can be used for increasing the efficiency of the auxiliary unit. The auxiliary unit is in this case preferably a heating heat exchanger and/or an electrical heating device. Advantageously, the auxiliary unit is connected at the inlet side to all the branch lines, so that the waste heat of all the fuel cells is used.

In order for a defined quantity of heated coolant to be fed to the auxiliary unit, a pump is preferably arranged in the inlet. In this case, a simple pump constructed in the manner of a water pump may be involved.

It is furthermore preferable for in each case one pump to be arranged in the coolant feed lines of the fuel-cell systems too. Via the coolant volume flows generated with the aid of the pumps, in each case a defined quantity of coolant is branched off from the common recirculation line and is fed to the respective fuel-cell system. Accordingly, with the aid of the pumps, the coolant can be distributed among the different cooling circuits.

It is furthermore possible with the aid of the pumps for heated coolant to be sucked in from the respective branch lines. The branch lines of the fuel-cell systems therefore preferably each open out into the respective coolant feed line upstream of the pump.

Advantageously, at least one heat exchanger is arranged in the cooling circuits or in the common recirculation line. With the aid of the heat exchanger, it is possible for the heat to be extracted again from heated coolant removed via a coolant discharge line from a fuel-cell system. If each cooling circuit has a heat exchanger, this is in each case arranged upstream of the common recirculation line. Alternatively, a heat exchanger for multiple cooling circuits may be arranged in the common recirculation line. In this way, the installation space requirement can be further reduced.

Via the at least one heat exchanger, a defined quantity of cooled coolant passes into the common recirculation line and, there, is mixed with a defined quantity of heated coolant from the branch lines.

BRIEF DESCRIPTION OF THE DRAWINGS

The invention will be discussed in more detail below on the basis of the appended drawings, in which.

DETAILED DESCRIPTION

Figure 1:
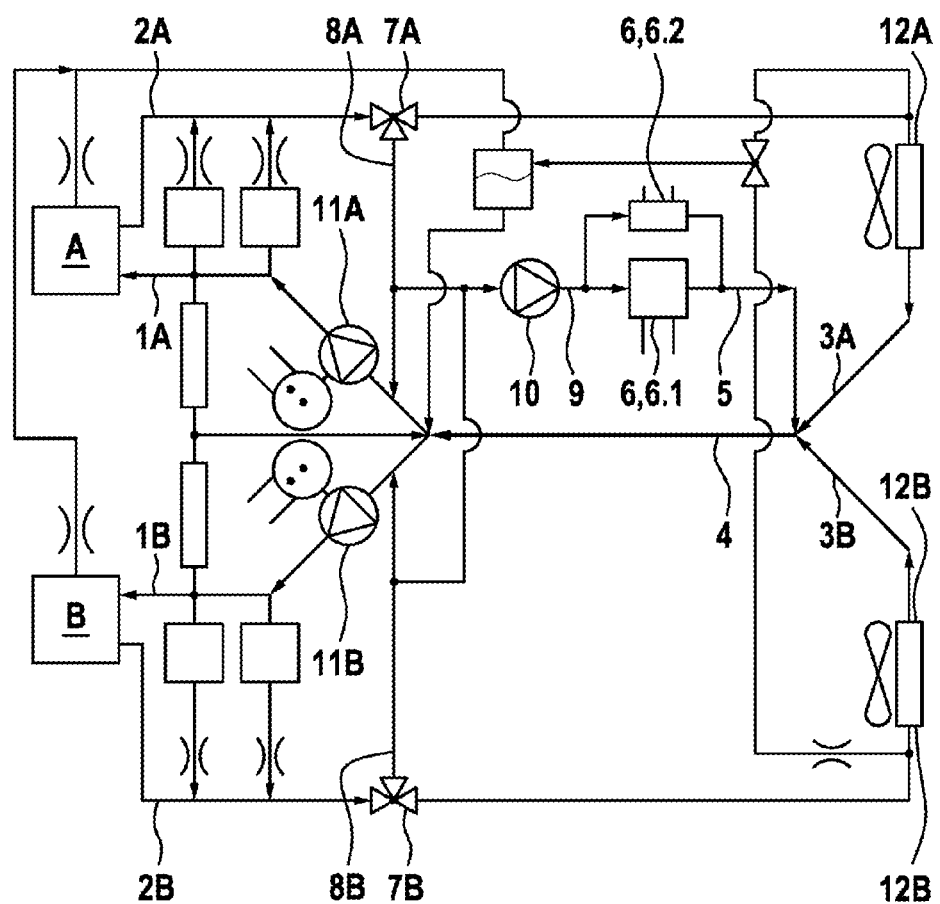
FIG. 1 shows a schematic illustration of a fuel-cell-system combination according to the invention.

A fuel-cell-system combination comprising two fuel-cell systems A and B can be seen by way of example in FIG. 1. Each fuel-cell system A, B can be operated at a different load point. Consequently, the cooling requirement of the fuel-cell systems A, B can vary. Each fuel-cell system A, B is therefore assigned a cooling circuit 3A, 3B, wherein, in the present case, the cooling circuits 3A, 3B are coupled via a common recirculation line 4. Accordingly, the same coolant circulates in the two cooling circuits 3A, 3B.

The first fuel-cell system A is connected to the cooling circuit 3A via a first coolant feed line 1A and a first coolant discharge line 2A. The second fuel-cell system B is connected to the cooling circuit 3B via a second coolant feed line 1B and a second coolant discharge line 2B. A heat exchanger 12A, 12B is arranged in each cooling circuit 3A, 3B in order to extract heat from heated coolant which is introduced from a fuel-cell system A, B into the respective cooling circuit 3A, 3B via the respective coolant discharge line 2A, 2B. The heat exchangers 12A, 12B are in each case incorporated in the respective cooling circuit 3A, 3B upstream of the common recirculation line 4. Alternatively, a heat exchanger 12 may be arranged in the common recirculation line 4.

In order to individually set the temperature of the coolant in the respective coolant feed lines 1A, 1B of the fuel-cell systems A, B, heated coolant can be introduced from the coolant discharge lines 2A, 2B into the coolant feed lines 1A, 1B. For this purpose, the coolant discharge lines 2A, 2B are each connected to the corresponding coolant feed line 1A, 1B via a branch valve 7A, 7B and a branch line 8A, 8B. The branch lines 8A, 8B each open out into the respective coolant feed line 1A, 1B upstream of a pump 11A, 11B. With the aid of pumps 11A, 11B, each fuel-cell system A, B can be fed the presently required quantity of coolant.

Figure 2:
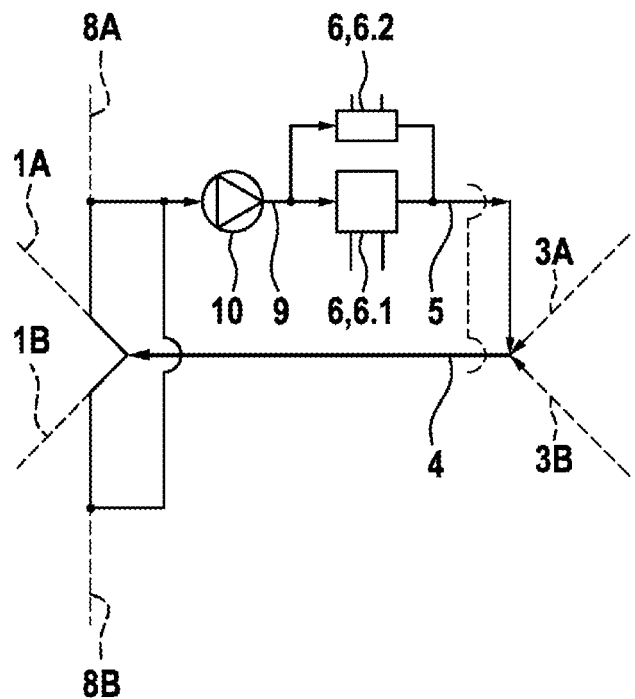
FIG. 2 shows an enlarged detail of FIG. 1 in the region of the connected auxiliary units.
Figure 3:
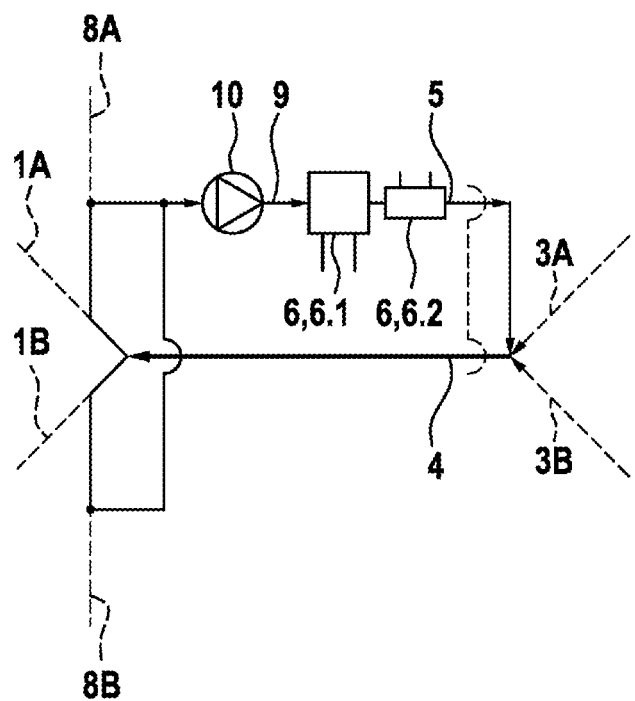
FIG. 3 shows a modification of the embodiment illustrated in FIG. 2.

The fuel-cell-system combination illustrated in FIG. 1 furthermore has two auxiliary units 6 which are integrated in an auxiliary circuit, which comprises an inlet 9 and a return 5. The auxiliary circuit is illustrated greatly enlarged in FIG. 2. Via the inlet 9, which has multiple branches, the auxiliary units 6 are connected to the branch lines 8A, 8B. Via a pump 10 arranged in the inlet 9, the auxiliary units 6 are fed coolant from the branch lines 8A, 8B. The auxiliary units 6 are connected in parallel in the present case, but may also be connected in series, as illustrated by way of example in FIG. 3. Via the return 5 of the auxiliary circuit, the auxiliary units 6 are connected to the common recirculation line 4.

The auxiliary units 6 involve in the present case an electrical heating device 6.1 by means of which the fuel-cell systems A, B can be fed heated coolant during a cold start. The electrical heating device 6.1 may thus be used as an independent heater for all the fuel-cell systems A, B. The quantity of coolant heated by means of the electrical heating device 6.1 moreover has to cover only a short coolant distance to the fuel-cell systems A, B. Furthermore, only a comparatively small quantity of coolant has to heated, and so the efficiency of the independent heater is increased.

The second auxiliary unit 6 is in the present case a heating heat exchanger 6.2 which uses the waste heat of the fuel-cell systems A, B for heating a passenger compartment. For this purpose, the heating heat exchanger 6.2 is fed heated coolant from the fuel-cell systems A, B via the branch lines 8A, 8B and the inlet 9. In this way, the waste heat of the fuel-cell systems A, B can be used for increasing the efficiency of the heating heat exchanger 6.2.

The invention claimed is:

1. A fuel-cell-system combination comprising at least two coupled fuel-cell systems (A, B) which are configured to be operated at different load points, wherein each fuel-cell system (A, B) is connected to in each case one respective cooling circuit (3A, 3B), with a circulating coolant, via a coolant feed line (1A, 1B) and a coolant discharge line (2A, 2B), wherein the cooling circuits (3A, 3B) are coupled via a common recirculation line (4), via which the coolant feed lines (1A, 1B) are supplied with coolant, wherein a return (5) with at least two auxiliary units (6.1, 6.2) is connected to the common recirculation line (4).

2. The fuel-cell-system combination as claimed in claim 1, wherein the at least two auxiliary units (6.1, 6.2), which are connected in parallel or in series, are connected to the common recirculation line (4) via the return (5).

3. The fuel-cell-system combination as claimed in claim 1, wherein the coolant discharge lines (2A, 2B) of the fuel-cell systems (A, B) are each configured to be connected to the corresponding coolant feed line (1A, 1B) of the respective fuel-cell system (A, B) via a branch valve (7A, 7B) and a branch line (8A, 8B).

4. The fuel-cell-system combination as claimed in claim 3, wherein an inlet (9) of at least one auxiliary unit (6) of the at least two auxiliary units (6.1, 6.2) is connected to at least one branch line (8A, 8B), wherein a pump (10) is arranged in the inlet (9).

5. The fuel-cell-system combination as claimed in claim 3, wherein in each case one pump (11A, 11B) is arranged in the coolant feed lines (1A, 1B) of the fuel-cell systems (A, B).

6. The fuel-cell-system combination as claimed in claim 5, wherein the branch lines (8A, 8B) of the fuel-cell systems (A, B) each open out into the respective coolant feed line (1A, 1B) upstream of the pump (11A, 11B).

7. The fuel-cell-system combination as claimed in claim 1, wherein at least one heat exchanger (12A, 12B) is arranged in the cooling circuits (3A, 3B) or in the common recirculation line (4).

8. The fuel-cell-system combination as claimed in claim 1, wherein each fuel-cell system (A, B) is connected to in each case one respective cooling circuit (3A, 3B) having a heat exchanger 12A, 12B.

9. A fuel-cell-system combination comprising at least two coupled fuel-cell systems (A, B) which are configured to be operated at different load points, wherein each fuel-cell system (A, B) is connected to in each case one cooling circuit (3A, 3B), with a circulating coolant, via a coolant feed line (1A, 1B) and a coolant discharge line (2A, 2B), wherein the cooling circuits (3A, 3B) are coupled via a common recirculation line (4), via which the coolant feed lines (1A, 1B) are supplied with coolant, wherein a return (5), with at least one auxiliary unit (6) is connected to the common recirculation line (4),
wherein the coolant discharge lines (2A, 2B) of the fuel-cell systems (A, B) are each configured to be connected to the corresponding coolant feed line (1A, 1B) of the respective fuel-cell system (A, B) via a branch valve (7A, 7B) and a branch line (8A, 8B), and
wherein an inlet (9) of the at least one auxiliary unit (6) is connected to at least one branch line (8A, 8B), wherein a pump (10) is arranged in the inlet (9).

10. A fuel-cell-system combination comprising at least two coupled fuel-cell systems (A, B) which are configured to be operated at different load points, wherein each fuel-cell system (A, B) is connected to in each case one cooling circuit (3A, 3B), with a circulating coolant, via a coolant feed line (1A, 1B) and a coolant discharge line (2A, 2B),
wherein the cooling circuits (3A, 3B) are coupled via a common recirculation line (4), via which the coolant feed lines (1A, 1B) are supplied with coolant, wherein a return (5), with at least two auxiliary units (6.1, 6.2), is connected to the common recirculation line (4), wherein the at least two auxiliary units (6.1, 6.2) are connected to the common recirculation line (4) via the return (5).

\* \* \* \* \*